Jan. 10, 1961

E. S. PEARSALL 2,967,544

VALVE STRUCTURE

Filed Dec. 3, 1954

INVENTOR.
EARLE S. PEARSALL
BY Fulwider, Mattingly
& Huntley
ATTORNEYS.

Jan. 10, 1961   E. S. PEARSALL   2,967,544
VALVE STRUCTURE

Filed Dec. 3, 1954   2 Sheets-Sheet 2

INVENTOR.
EARLE S. PEARSALL
BY Fulwider, Mattingly
and Huntley
ATTORNEYS.

United States Patent Office 2,967,544
Patented Jan. 10, 1961

2,967,544

VALVE STRUCTURE

Earle S. Pearsall, 15773 Union Ave., Los Gatos, Calif.

Filed Dec. 3, 1954, Ser. No. 473,003

3 Claims. (Cl. 137—622)

The present invention relates generally to the field of fluid mechanics and more particularly to a novel and improved form of valve for controlling the flow of fluids.

The valve structure of the present invention was developed primarily to replace the conventional spool-type valve which is utilized extensively in the field of hydraulics. The common type of spool valve includes a valve body formed with a cylindrical bore which is intersected by one or more radial ports, and a cylinder-shaped spool that is axially movable within the bore so as to cover and uncover the port or ports and thereby control the flow of fluids through the bore. One of the main disadvantages of the spool-type valve results from the comparatively large opening created between the bore and the port the instant the spool is moved from a closed to an open position. The sudden surge of hydraulic fluid through this comparatively large opening creates undesirable abrupt pressure changes in the valve and hence in the hydraulic system wherein it is employed. Conversely, when the spool is moved from an open to a closed position the sudden closing of the comparatively large opening between the bore and the port will likewise create abrupt pressure changes.

Another serious disadvantage of the spool-type valve is its comparatively high cost of manufacture. Such high cost results from the careful machining necessitated by the close tolerances that must exist between the spool and the cylindrical bore.

Yet another disadvantage of the spool-type valve is the well-known tendency of the spool to become jammed in the bore. Such jamming is especially liable to occur where a plurality of aligned spools are employed in a comparatively long radially-ported bore.

It is the major object of the present invention to provide a novel type of valve structure which eliminates the above-described disadvantages of a spool-type valve.

The preferred form of valve structure embodying the present invention contemplates the use of a ball-shaped element in a radially-ported bore, the ball being movable within the bore across the mouth of the port so as to control the flow of fluids through said port. The uetilization of a ball-shaped element in place of the cylindrical spool of the conventional spool-type valve permits a gradual uncovering or covering of the port when the valve is opened or closed. Such gradual uncovering and covering of the port permits a comparatively surge-free flow of fluid to occur within the valve. The utilization of the ball-shaped element in place of a spool also lowers the manufacturing cost of the valve, inasmuch as accurately dimensioned balls in a variety of sizes are widely available at low cost, e.g. the balls utilized in ball bearings. The use of a ball-shaped element in place of a spool moreover eliminates the danger of valve stickage. This is especially true where a plurality of balls are utilized within a single cylindrical bore having multiple radial ports.

A further object is to provide a valve structure which will afford a long and trouble-free service life.

An additional object of the invention is to provide a valve structure of the aforedescribed nature which is especially adapted for use with liquids containing solids.

Yet a further object is to provide a valve structure that may be formed with a curved or arcuate radially-ported bore.

These and other objects and advantages of the present invention will become apparent from the following detailed description, when taken in conjunction with the appended drawings wherein.

Figure 1:
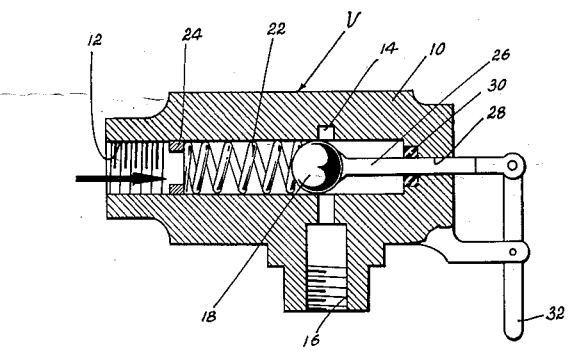
Figure 1 is a central vertical sectional view of a valve embodying the present invention.
Figure 2:
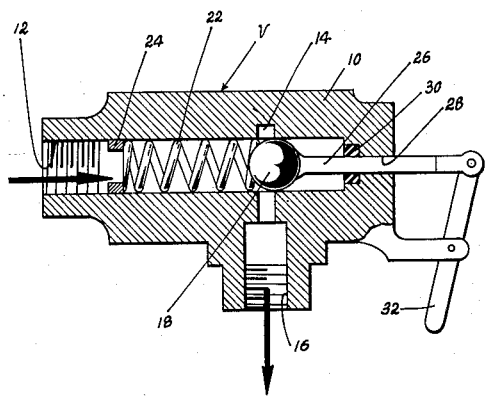
Figure 2 is a view similar to Figure 1, but showing the parts of said valve arranged in an open position.

Referring to the drawings, and particularly Figures 1 and 2 thereof, the valve V shown therein includes a body 10 formed with a cylindrical inlet bore 12 which is intersected by an annular groove 14 that defines the mouth of an outlet port 16. A ball 18 is axially movably disposed within the bore 12. The diameter of the ball 18 approximates that of the bore 12 so that the ball may effect line sealing contact therewith when its mid-portion is disposed to the left of groove 14, as shown in Figure 1. The ball may be constantly biased toward its open position by means of a helical compression spring 22 positioned within the bore 12. One end of this spring 22 abuts the left side of the ball 18, while the other end of the spring abuts the right side of a retainer ring 24 threadedly retained within the open left end of the bore 12.

The opposite side of the ball 18 is in engagement with the free end of a push rod 26 having its intermediate portion slidably disposed in a passage 28 that forms a right-hand continuation of the bore 12. A suitable resilient seal 30 may be provided between the push rod 26 and the passage 28. The push rod 26 is axially movable relative to the bore 12 under the influence of a control handle 32 having its intermediate portion pivotally attached to the body 10. When the free end of the control handle 32 is moved to the left relative to Figures 1 and 2 the spring 22 will urge the ball to the right to its position of Figure 2, the ball uncovering the groove 14 as it moves to the right.

It should be observed that the spherical surface of the ball 18 will always come to a tangent with the inner periphery of the bore 12 at the point where the left-hand edge of groove 14 intersects the bore. Accordingly, an infinitely small orifice will be provided between the bore and the groove when the latter is first uncovered by the ball 18. Hence, the abrupt pressure surge normally resulting from the opening of an ordinary spool-type valve will not take place. It should likewise be observed that although the ball 18 is adapted to effect line sealing contact with the inner periphery of the bore 12, the ball will offer but slight resistance to its axial movement along the bore.

It will be apparent that the same desirable results described above will be obtained where the flow of fluid takes place from outlet port 16 to inlet port 12.

Figure 3:
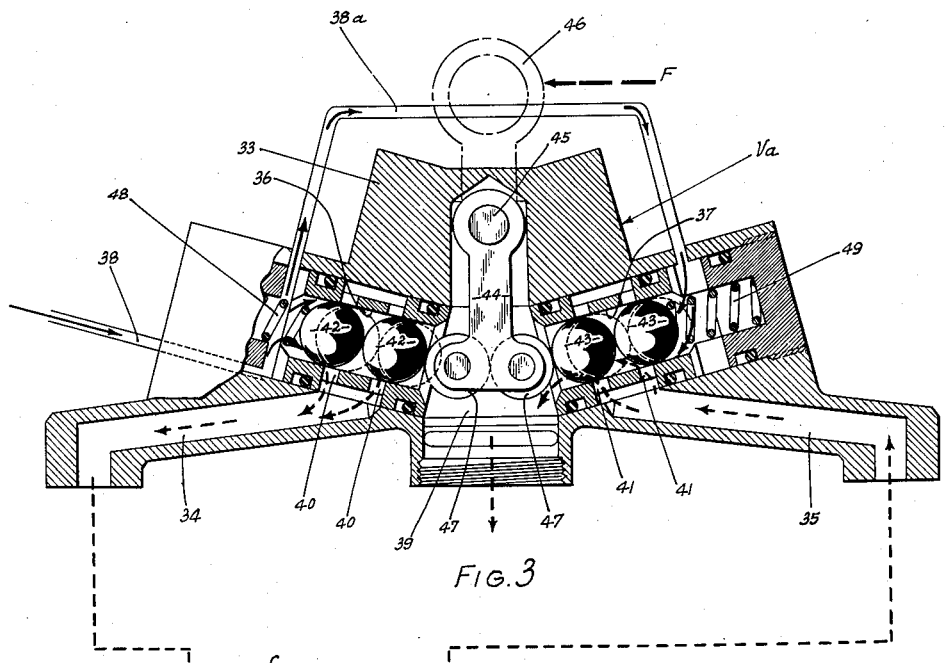
Figure 3 is a central vertical sectional view of another form of valve embodying the present invention.

Referring now to Figure 3, there is shown another form of valve $V_a$ that embodies the present invention. This valve $V_a$ is especially adapted for use as a control valve in a hydraulic system, as for example, in controlling the reciprocation of a piston P within a cylinder C. The valve $V_a$ includes a body 33 formed with a pair of passages 34 and 35 at its opposite sides. The latter are connected in a suitable manner to the opposite ends of the cylinder C. The body 33 is also formed with a pair of cylindrical bores 36 and 37 which are in communication with the passages 34 and 35, respectively. The outer ends of the bores 36 and 37 are each connected to a source of fluid pressure (not shown) by means of a conduit 38 having a branch $38_a$ that interconnects the outer ends of these bores. The inner end of these bores intersect a return chamber 39 formed in the mid-portion of the valve body 33. This return chamber 39 is in communication with a return conduit (not shown) that empties into the source of fluid pressure.

The bore 36 is formed with a pair of axially spaced grooves 40 that are in communication with the passage 34. The bore 37 is likewise formed with a pair of axially spaced annular grooves 41 that are in communication with the other passage 35. A first pair of balls 42 are axially movably disposed within the bore 36, while a second pair of balls 43 are axially movably disposed within the bore 37. The periphery of each of the balls 42 and 43 is in line sealing contact with the walls of the bores 36 and 37. The balls 42 and 43 are caused to move axially within the bores 36 and 37 across the grooves 40 and 41 under the influence of an actuating arm 44. The upper end of the latter is pivotally secured to the mid-portion of the valve body 33 by a horizontal pin 45. This pin 45 is in turn keyed to an upstanding control handle 46 which protrudes from one side of the upper portion of the valve body 33. The lower end of the actuating arm 44 carries a pair of rollers 47 which abut the innermost of the balls 42 and 43. Helical compression springs 48 and 49 disposed in the outer ends of the bores 36 and 37 constantly bias the balls 42 and 43, respectively, inwardly toward the rollers 47.

In the operation of this valve $V_a$, the balls 42 and 43 will normally be disposed in their solid line position of Figure 3. At this time fluid under pressure will be disposed in the outer ends of the bores 36 and 37, as indicated by the solid line arrows. This pressurized fluid will be blocked from entering either of the passages 34 and 35 by the outermost of the balls 42 and 43. Hence, no fluid movement will take place within the passages 34 and 35. When, however, the control handle 46 is moved to the left, as by a force F, the balls 42 and 43 will be urged to the right to their dotted line positions within the bores 36 and 37. The balls 42 will then uncover the annular grooves 40 so as to admit pressurized fluid into the passage 34. The fluid entering grooves 40 and passage 34 will flow into the left end of the cylinder C so as to cause the piston P to move to the right therein. At the same time, the balls 43 will uncover the annular grooves 41 so as to permit fluid entering the passage 35 from the right end of the cylinder to flow into the return chamber 39. The innermost of the balls 42 will block any flow between the return chamber and the left bore 36. The flow of fluid through the bores 36 and 37 and the passages 34 and 35 when the control handle is urged to the left is indicated in Figure 3 by the dotted outline arrows. It will be apparent, that upon movement of the control handle 46 to the right, a reversal of the fluid flow in the passages 34 and 35 will take place.

Figure 4:
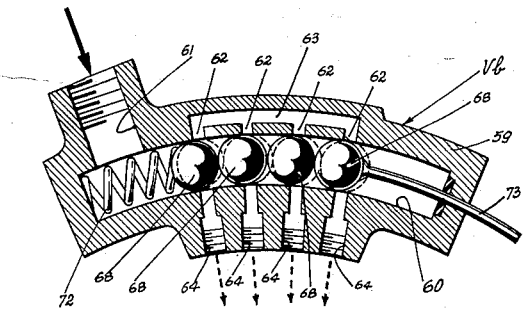
Figure 4 is a central vertical sectional view of yet another form of valve embodying the present invention.

Referring now to Figure 4, it should be noted that one of the advantages of a valve structure embodying the present invention is that such structure may utilize a curved or arcuate radially-ported bore. Thus, in Figure 4 there is shown a valve $V_b$ having a body 59 formed with an arcuate cylindrical bore 60 having an inlet 61. A plurality of axially spaced annular grooves 62 are formed along the length of the bore 61. The grooves 62 are interconnected by a passage 63 and the lower portion of each groove merges into an outlet port 64. The outlet ports 64 are normally closed by balls 68 disposed within the bore 61. The balls 68 are constantly biased to the right towards an open position by a helical compression spring 72. The right-hand ball abuts the left end of a push rod 73, the right end of which rod protrudes from the body 59. When the balls 68 are moved to the right to their dotted line position of this figure by means of the spring 72 and push rod 73, communication will be established between the inlet 61 and the outlet ports 64 by means of the grooves 62 and the passage 63. It will be apparent that the balls will be free to move along the bore 61 between their open and closed positions. The difficulty and expense of constructing a comparable spool-type valve having a curved radially ported bore will likewise be readily apparent. It should be noted that where a plurality of balls are employed, any two adjoining balls may be rigidly mechanically connected if so desired. Where a plurality of balls are utilized it is possible to mechanically connect more than two of them so long as their interconnection permits axial freedom of movement relative to the bore.

Figure 5:
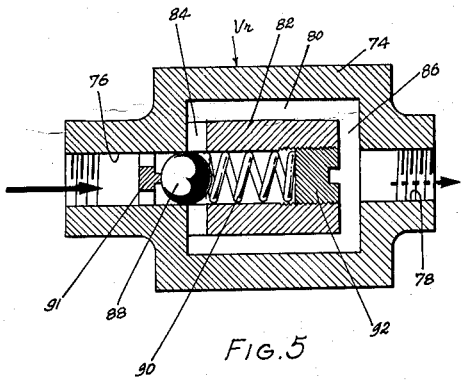
Figure 5 is a central vertical sectional view of a pressure-relief valve that embodies the present invention.

Referring now to Figure 5, there is shown a pressure-relief valve $V_r$ that incorporates the present invention. This valve $V_r$ includes a body 74 having an inlet bore 76 and an outlet bore 78. The intermediate portion of the body 74 includes an annular by-pass chamber 80 defined by an integral seating element 82. The by-pass chamber 80 is connected to the inlet bore 76 by means of a plurality of radially-directed ports 84, and with the outlet bore 78 by a radially inwardly-directed extension 86. Communication between the inlet bore 76 and the ports 84 will normally be prevented by a ball 88 that is axially movably disposed within the inlet bore, a helical compression spring 90 constantly biasing this ball into its solid line position of this figure against a stop element 91. In this position the mid-portion of the ball is disposed upstream from the upstream edge of the ports 84. When, however, the pressure entering the front of the inlet bore 76 reaches a predetermined maximum value the ball 88 will be moved downstream, or to the right in Figure 5, against the force of the spring 90. In moving downstream the ball will uncover the ports 84 and permit fluid to flow through the by-pass chamber 80 and out of the outlet bore 78. When the pressure of the fluid entering the inlet bore 76 has been reduced below the predetermined maximum value, the spring 90 will return the ball to its original position. The effective force exerted by the spring 90 against the ball 88 may be adjusted by rotation of a threaded plug 92 carried by the seating element 82. It should be particularly observed that the ball 88 acts as a piston within the bore 76, just as in the case of the conventional cylindrical element found in the ordinary pressure-relief valve.

Figure 6:
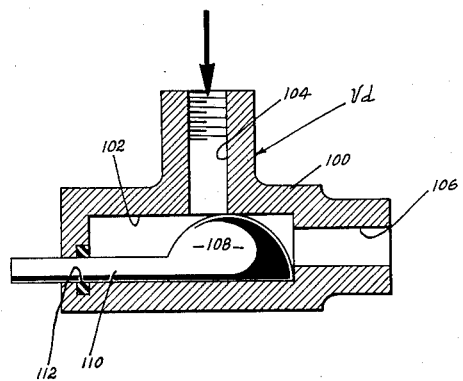
Figure 6 is a central vertical sectional view of still another form of valve embodying the present invention.
Figure 7:
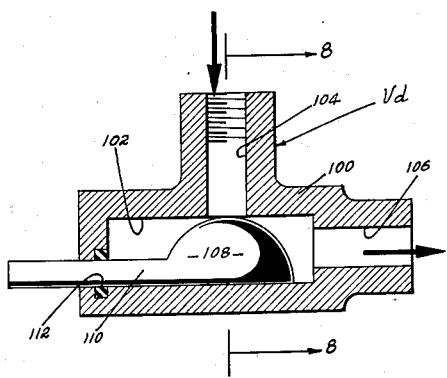
Figure 7 is a view similar to Figure 6, but showing the parts of said valve arranged in open position.
Figure 8:
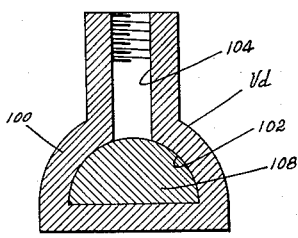
Figure 8 is a vertical sectional view taken on line 8—8 of Figure 7.

Referring now to Figures 6, 7 and 8, there is shown still another form of valve $V_d$ embodying the present invention. This valve $V_d$ includes a body 100 formed with a semi-circular passage 102 that is intersected at its intermediate portion by an inlet port 104 and at its right end by an outlet 106. A valve element 108 of generally hemispherical configuration is axially movably disposed within the passage 102. This valve element 108 has a central transverse cross-section corresponding to that of the passage 102 whereby it will effect a line sealing contact therewith. The valve element 108 is provided with an integral push rod 110 that extends outwardly of the body 100 through a sealed opening 112.

When the valve element 108 is in its position of Figure 6 with its mid-portion disposed downstream of the downstream edge of the inlet port 104 it will block the flow of hydraulic fluid through the passage 102. When, however, the valve element is urged upstream towards its position of Figure 7, hydraulic fluid may flow from the inlet port 104 into the passage 102 and then out of the outlet 106. It should be observed that the valve element 108 presents a ball-shaped surface to the mouth of the inlet port 104. Accordingly, an infinitely small opening will be provided between the passage 102 and the inlet port 104 when the latter is first covered or uncovered by the valve element. Hence, a smooth pressure change may take place within the hydraulic fluid passing through the valve as it is opened or closed.

Figure 9:
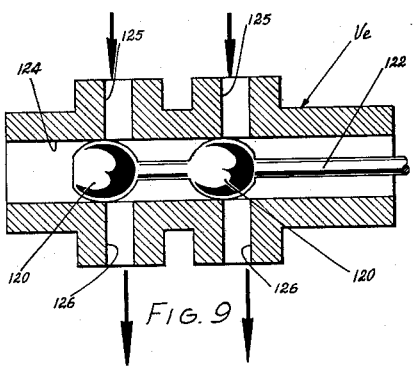
Figure 9 is a cross-sectional view of an additional form of valve embodying the present invention.

It should be observed that although each of the valve elements shown in Figures 1 through 8 present a generally spherical surface to their respective inlet ports, these surfaces need not be of a truly spherical configuration. Thus, in Figure 9 there is shown a cross-sectional view of a valve $V_e$ having a pair of valve elements 120 which are not fully spherical in shape. These valve elements 120 are rigidly secured to a control rod 122 by means of which they may undergo axial movement along a bore 124. The bore 124 is formed with radially extending inlet ports 125 and outlet ports 126 with which the valve elements 120 cooperate. It has been found that even though the cross-section of these valve elements is not truly spherical they will function in a very satisfactory manner and provide a smooth pressure change within the fluid passing through the valve $V_e$ between its inlet and outlet ports 125 and 126, respectively.

From the foregoing description it will be apparent that the valve structure of the present invention readily lends itself to use with a hydraulic system containing one or more mechanisms, and when so utilized it will afford a smoothness of operation not obtainable with a conventional spool-type valve. Additionally, the valve structure disclosed herein provides a consistency of flow characteristics regardless of the size of its component parts. It has been determined that the ball element of the present valve structure will quickly clear itself of any foreign material carried by the hydraulic liquid flowing therethrough. While the ball element will generally be formed of metal, other materials may also be employed. The ball elements may serve concurrently as both valve elements and pistons where springs are utilized to bias them towards a closed position. Thus, upon an increase in fluid pressure over a predetermined value the balls will tend to move toward their low pressure side.

It is important to observe that although several embodiments of the valve structure of the present invention have been shown and described herein, the invention is not limited to any one or all of these embodiments. Instead, various modifications and changes may be made without departing from the spirit of the invention or the scope of the following claims.

I claim:

1. A valve structure, comprising: a body formed with a first and a second bore, the inner ends of said bores intersecting a return chamber formed in said body; means in said body for connecting the outer ends of said bores to a source of fluid under pressure; a radially extending opening formed in each of said bores; a ball disposed in each of said bores and having line sealing contact therewith, said balls normally blocking flow from the outer ends of said bores into said openings; spring means disposed in the outer ends of said bores for biasing said balls toward their normal position; and, means operatively connected with said body for moving said balls axially within said bores whereby the opening in one of said bores will be exposed to the outer end thereof while the opening in the other bore is exposed to said return chamber.

2. A valve structure, comprising: a body formed with a first and a second cylindrical bore, the inner end of each of said bores intersecting a return chamber formed in said body; means in said body for connecting the outer ends of said bores to a source of pressure fluid; a pair of axially spaced annular grooves formed in each of said bores; first and second passages formed in said body and communicating with the annular grooves of said first and second bores, respectively; a pair of balls in said bores, the outermost of said balls in said bores normally blocking flow from the outer ends of said bores into the outermost of said grooves, and the innermost of said balls normally blocking flow from said passages into said return chamber; spring means disposed in the outer ends of said bores for constantly biasing said balls inwardly toward said return chamber; and, an actuating arm disposed in said return chamber and engaging the innermost of said balls, movement of said arm toward said first bore causing the balls in said second bore to expose the grooves formed therein to the outer end thereof and the balls in the first bore to expose the grooves formed therein to said return chamber.

3. A valve structure as set forth in claim 2 where one end of said actuating arm is pivotally secured to said body by a pin that is connected to a control handle exterior of said body, and the opposite end of said arm carries a pair of rollers that abut the innermost of said balls.

References Cited in the file of this patent

UNITED STATES PATENTS

| | | |
|---|---|---|
| 816,246 | Norling | Mar. 27, 1906 |
| 1,259,858 | Hague | Mar. 19, 1918 |
| 1,644,093 | Shownard | Oct. 4, 1927 |
| 2,054,464 | Johnson | Sept. 15, 1936 |
| 2,082,397 | Hiscock | June 1, 1937 |
| 2,185,325 | Barrett | Jan. 2, 1940 |
| 2,383,278 | Stevens | Aug. 21, 1945 |
| 2,419,908 | Mott | Apr. 29, 1947 |
| 2,747,595 | Dickey | May 29, 1956 |

FOREIGN PATENTS

| | | |
|---|---|---|
| 792,156 | France | Oct. 14, 1935 |
| 849,370 | France | 1939 |
| 58,686 | France | Oct. 28, 1953 |
| | (Addition to No. 969,086) | |
| 561,698 | Great Britain | 1944 |
| 592,093 | Great Britain | 1947 |